(12) United States Patent
Charles et al.

(10) Patent No.: US 8,494,451 B2
(45) Date of Patent: Jul. 23, 2013

(54) METHOD, APPARATUS AND COMPUTER PROGRAM PRODUCT FOR PROVIDING CIPHERING PROBLEM RECOVERY FOR UNACKNOWLEDGED MODE RADIO BEARER

(75) Inventors: Alexander Graham Charles, Fleet (GB); Keiichi Kubota, Weybridge (JP); Brian Martin, Farnham (GB)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 12/363,001

(22) Filed: Jan. 30, 2009

(65) Prior Publication Data

US 2010/0197230 A1 Aug. 5, 2010

(51) Int. Cl.
*H04B 1/00* (2006.01)
*H04B 15/00* (2006.01)

(52) U.S. Cl.
USPC ............... 455/63.1; 455/67.13; 455/452.1; 375/130; 375/136

(58) Field of Classification Search
USPC ........ 455/63.1, 67.13, 452.1, 452.2; 375/130, 375/136, 137, 138, 147
See application file for complete search history.

(56) References Cited

U.S. PATENT DOCUMENTS

| | | | |
|---|---|---|---|
| 5,694,473 A | 12/1997 | Bright et al. | |
| 6,161,207 A | 12/2000 | Lockhart et al. | |
| 7,093,040 B1 * | 8/2006 | Mach | 710/100 |
| 7,388,883 B2 | 6/2008 | Jiang | |
| 7,706,537 B2 | 4/2010 | Yi et al. | |
| 7,870,496 B1 | 1/2011 | Sherwani | |
| 8,098,771 B2 | 1/2012 | Herrmann | |
| 2004/0147236 A1 | 7/2004 | Parkvall et al. | |
| 2005/0270996 A1 * | 12/2005 | Yi et al. | 370/312 |
| 2006/0050679 A1 | 3/2006 | Jiang | |
| 2007/0206673 A1 * | 9/2007 | Cipolli et al. | 375/240.1 |
| 2010/0034187 A1 | 2/2010 | Kumar et al. | |
| 2010/0136995 A1 * | 6/2010 | Yi et al. | 455/452.1 |

FOREIGN PATENT DOCUMENTS

| | | |
|---|---|---|
| JP | 2003-339075 | 11/2003 |
| JP | 2005-518135 | 6/2005 |
| JP | 2006-087097 | 3/2006 |
| JP | 2006-217100 | 8/2006 |
| JP | 2009-122831 | 6/2009 |
| WO | WO 2008/156301 A2 | 12/2008 |

OTHER PUBLICATIONS

International Search Report and favorable Written Opinion issued in connection with International Application No. PCT/FI2009/051039 and mailed on Apr. 19, 2010.

(Continued)

*Primary Examiner* — Tuan H Nguyen
(74) *Attorney, Agent, or Firm* — Alston & Bird LLP

(57) ABSTRACT

An apparatus for providing ciphering problem detection may include a processor. The processor may be configured to receive an unacknowledged mode message, initiate operation of a timer based on receipt of the unacknowledged mode message, re-initiate timer operation in response to each subsequent unacknowledged mode message received prior to expiration of the timer, record a timer expiry event in response to the timer expiring prior to receipt of a subsequent unacknowledged mode message, and indicate a data reception error in response to receipt of the subsequent unacknowledged mode message after recordation of the timer expiry event.

21 Claims, 7 Drawing Sheets

OTHER PUBLICATIONS

Office Action for U.S. Appl. No. 12/494,957 dated Apr. 2, 2012.
Communication from Korean Patent Application No. 2011-702011, dated Aug. 14, 2012.
Office Action for Japanese Application No. 2011-546889; dated Jan. 28, 2013.
Communication from Russian Patent Application No. 2011135623, dated Dec. 6, 2012.

* cited by examiner

METHOD, APPARATUS AND COMPUTER PROGRAM PRODUCT FOR PROVIDING CIPHERING PROBLEM RECOVERY FOR UNACKNOWLEDGED MODE RADIO BEARER

TECHNOLOGICAL FIELD

Embodiments of the present invention relate generally to communications technology and, more particularly, relate to apparatuses, methods and computer program products for providing for detection and recovery from a ciphering problem for an unacknowledged mode radio bearer.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content.

Communication networks and technologies have been developed and expanded to provide robust support for mobile electronic devices. For example, the Worldwide Interoperability for Microwave Access (WiMAX), is a telecommunications technology aimed at providing wireless data over long distances in a variety of ways, from point-to-point links to full mobile cellular type access. The evolved universal mobile telecommunications system (UMTS) terrestrial radio access network (E-UTRAN) is also currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

In a typical network configuration mobile users communicate with each other via communication links maintained by the network. In this regard, for example, an originating station may typically communicate data to network devices in order for the network devices to relay the data to a target station. The quality of service (QoS) of the radio links may be managed by an entity referred to as a radio link controller (RLC). The RLC may manage QoS of each radio bearer (RB) and the transmission of data of each RB via different types of RLC modes. Some examples of modes may include a transparent mode (TM), an acknowledged mode (AM) and an unacknowledged mode (UM). Each mode may support a corresponding different QoS. For example, TM may be a mode in which no overhead is attached to an RLC service data unit (SDU) received from a higher layer when constituting a protocol data unit (PDU). As such, the RLC may pass the SDU in a transparent manner. In non-transparent modes like AM and UM, overhead is added at the RLC.

In AM, the AM RLC constitutes a PDU by adding a PDU header that includes a sequence number that can be used by the receiver to determine whether a PDU has been lost during transmission. The receiver also provides acknowledgement for PDUs received and thus re-transmission may be requested for PDUs that were not received in order to improve efforts to provide error-free data transmission via re-transmissions when necessary. Due to the potential for re-transmissions, AM may be more well suited for non-real-time packet transmissions.

UM, unlike AM, does not provide acknowledgement for PDUs received. Thus, although the receiver may still use a sequence number provided in the PDU header to determine whether any PDU has been lost, the transmitter receives no acknowledgements for PDUs transmitted and therefore does not check whether the receiver is properly receiving transmitted PDUs. Thus, once a PDU is transmitted, the PDU is typically not retransmitted. Due to the fact that UM does not provide re-transmissions of PDUs, UM may be more suitable to real-time packet transmissions such as voice over Internet protocol (VoIP), broadcast/multicast data and other real-time services. Circuit switched (CS) voice calls may be an example of a service for which UM may provide network support. In particular, CS voice over high speed packet access (HSPA) has been introduced for WCDMA (wideband code division multiple access) in order to attempt to improve frequency efficiency and battery life by mapping CS voice services on high speed uplink packet access (HSUPA) and high speed downlink packet access (HSDPA). As such, for example, a CS voice over HSPA radio access bearer (RAB) may be mapped on a UM RLC and an adaptive multi-rate (AMR) voice codec may send audio frames, for example, for each 20 ms if audio data exists or send an AMR SID (e.g., a silence frame) for each 160 ms if no audio data exists (e.g., in silent periods).

Despite the potential for utility of UM in applications such as those described above, a ciphering problem may occur when the receiver fails to receive a certain number of consecutive UM data PDUs. For example, if the receiver fails to receive more than 127 consecutive UM data PDUs, the receiver may miss the timing to increment a hyper frame number (HFN) value so that COUNT-C values in the receiver and the transmitter may fall out of synchronization. Some exemplary situations in which the ciphering problem is encountered may include cases of bad radio conditions, hard handoffs, a fallback after a hard handoff, or a fallback after an intersystem handover to GSM (global system for mobile communication) failure. In the case of CS voice over HSPA, the ciphering problem may occur if the network keeps sending UM data PDUs and the user equipment (UE) or mobile terminal of the user keeps failing to receive the UM data PDUs for a period of about 2.56 seconds in the downlink direction, or if the UE keeps sending UM data PDUs and the network keeps failing to receive the UM data PDUs for 1.28 seconds in the uplink direction.

Although recovery mechanisms currently exist for recovering from the ciphering problem in relation to TM and AM operation, there is currently no mechanism for detecting and recovering from the ciphering problem in relation to UM operation. In light of the issues discussed above, it may be desirable to provide a mechanism for improving UM capabilities with respect to the ciphering problem.

BRIEF SUMMARY OF EXEMPLARY EMBODIMENTS

A method, apparatus and computer program product are therefore provided that may enable detection of the ciphering problem and subsequent recovery therefrom. Accordingly, an exemplary embodiment of the present invention may enable the use of a timer to detect data transfer problems that may be indicative of the ciphering problem during UM operation. Thereafter, some embodiments may provide a mechanism for recovery from the detected ciphering problem.

In one exemplary embodiment, a method of providing detection (and in some cases recovery) from a ciphering problem for an unacknowledged mode radio bearer is provided. The method may include receiving an unacknowledged mode message, initiating operation of a timer based on receipt of the unacknowledged mode message, re-initiating timer operation in response to each subsequent unacknowledged mode message received prior to expiration of the timer, recording a timer expiry event in response to the timer expiring prior to receipt of a subsequent unacknowledged mode message, and indicating a data reception error in response to receipt of the subsequent unacknowledged mode message after recordation of the timer expiry event.

In another exemplary embodiment, a computer program product for providing detection (and in some cases recovery) from a ciphering problem for an unacknowledged mode radio bearer is provided. The computer program product may include at least one computer-readable storage medium having computer-readable program code instructions stored therein. The computer-readable program code instructions may include executable portions for receiving an unacknowledged mode message, initiating operation of a timer based on receipt of the unacknowledged mode message, re-initiating timer operation in response to each subsequent unacknowledged mode message received prior to expiration of the timer, recording a timer expiry event in response to the timer expiring prior to receipt of a subsequent unacknowledged mode message, and indicating a data reception error in response to receipt of the subsequent unacknowledged mode message after recordation of the timer expiry event.

In another exemplary embodiment, an apparatus for providing detection (and in some cases recovery) from a ciphering problem for an unacknowledged mode radio bearer is provided. The apparatus may include a processor that may be configured to receive an unacknowledged mode message, initiate operation of a timer based on receipt of the unacknowledged mode message, re-initiate timer operation in response to each subsequent unacknowledged mode message received prior to expiration of the timer, record a timer expiry event in response to the timer expiring prior to receipt of a subsequent unacknowledged mode message, and indicate a data reception error in response to receipt of the subsequent unacknowledged mode message after recordation of the timer expiry event.

In another exemplary embodiment, an apparatus for providing detection (and in some cases recovery) from a ciphering problem for an unacknowledged mode radio bearer is provided. The apparatus includes means for receiving an unacknowledged mode message, means for initiating operation of a timer based on receipt of the unacknowledged mode message, means for re-initiating timer operation in response to each subsequent unacknowledged mode message received prior to expiration of the timer, means for recording a timer expiry event in response to the timer expiring prior to receipt of a subsequent unacknowledged mode message, and means for indicating a data reception error in response to receipt of the subsequent unacknowledged mode message after recordation of the timer expiry event.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
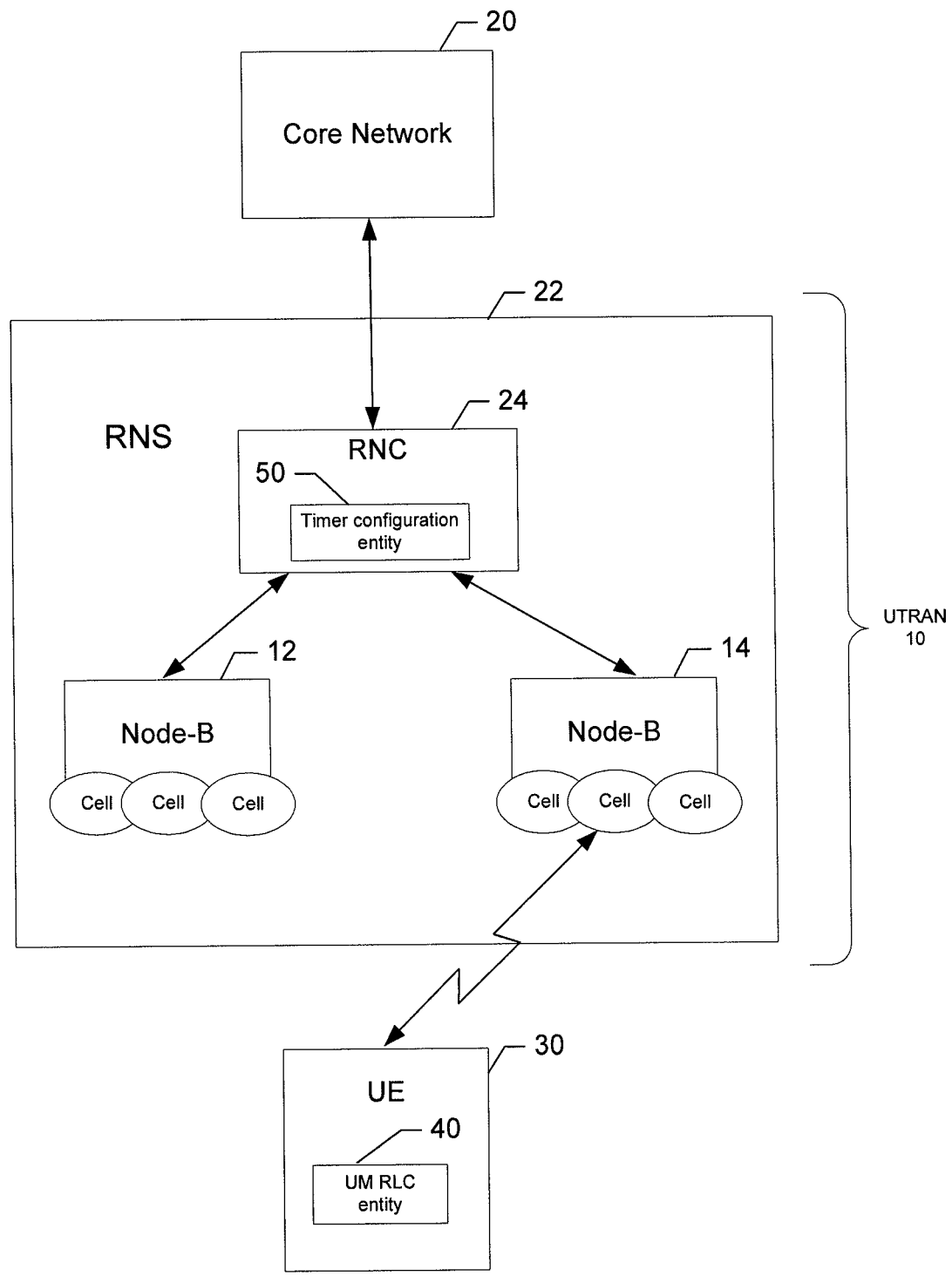
FIG. 1 is a schematic block diagram of a wireless communications system according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Referring now to FIG. 1, a schematic block diagram showing a system for providing a mechanism for enabling detection and recovery from a ciphering problem for an unacknowledged mode radio bearer according to an exemplary embodiment of the present invention is provided. However, FIG. 1 is illustrative of one exemplary embodiment, and it should be understood that other architectures including additional or even fewer elements may also be employed in connection with practicing embodiments of the present invention. The system includes UTRAN 10 which may include, among other things, a plurality of node-Bs (e.g., node-B 12 and node-B 14) in communication with core network 20 which may include one or more mobile switching center (MSC), MSC server, media gateway (MGW), signaling GPRS (General Packet Radio Service) support node (SGSN) or gateway GPRS support node (GGSN). The UTRAN 10 may include one or more radio network sub-systems (RNSs) 22. Each RNS 22 may include a radio network controller (RNC) 24 in communication with various node-Bs.

The node-Bs may each act as base stations or access points for various user terminals that may each be referred to as user equipment (e.g., UE 30) to communicate with the UTRAN 10. Each node-B may include one or more cells or coverage areas that define regions of coverage in which UEs located in a particular cell may be enabled to communicate with the UTRAN 10 via the respective node-B associated with the particular cell. Although FIG. 1 only shows a specific number of node-Bs and one UE, there could be a plurality of nodes and user terminals included in the system. The UTRAN 10 may be in communication with the core network 20 as part of a packet service (PS) domain (e.g., for VoIP). The RNC 24 may also communicate with CS domain core network nodes for CS over HSPA.

The RNC 24 may provide user plane and control plane (e.g., radio resource control (RRC)) protocol terminations for the UE. The RNCs may provide functionality hosting for such functions as radio resource management, radio bearer control, radio admission control, connection mobility control, dynamic allocation of resources to UE 30 in both uplink and downlink, selection of a core network node at UE attachment, IP header compression and encryption, scheduling of paging and broadcast information, routing of data, measurement and measurement reporting for configuration mobility, and the like. In an exemplary embodiment, the core network 20 may provide connection to a network such as the Internet.

The UE 30 may be in communication with other UEs via device to device communication that may have been established by any known or available mechanism. The UE may be an example of a mobile terminal such as portable digital assistant (PDA), pager, mobile television, gaming device, laptop computer, cameras, video recorder, audio/video player, radio, global positioning system (GPS) device, or any combination of the aforementioned, or other type of voice and text communications device. In this regard, for example, the UE 30 may be capable of operating with one or more air interface standards, communication protocols, modulation types, and access types. By way of illustration, the UE 30 may be capable of operating in accordance with any of a number of first, second, third and/or fourth-generation communication protocols or the like. For example, the UE 30 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the UE 30 may be capable of operating in accordance with non-cellular communication mechanisms. For example, the UE 30 may be capable of communication in a wireless local area network (WLAN) or other communication networks.

In an exemplary embodiment, the UE 30 may include a UM RLC entity 40. The UM RLC entity 40 may be any means such as a device or circuitry embodied in hardware, software or a combination of hardware and software that is configured to detect data transfer problems such as the ciphering problem and assist in providing recovery from a detected problem. In an exemplary embodiment, the UM RLC entity 40 may include a timer that may be network configurable or hard-coded to have a timer value that may be utilized in connection with detection of data transfer problems such as the ciphering problem. Operation of the UM RLC entity 40 according to an exemplary embodiment will be described in greater detail below in connection with the description of FIG. 2. Notably, although the UM RLC entity 40 is shown as being a portion of the UE 30 in FIG. 1, an instance of the UM RLC entity 40 may also exist at a network entity such as the RNC 24 in some embodiments. Thus, the network may also be capable of detecting data reception errors using embodiments of the present invention in some cases.

In an exemplary embodiment, one or more of the RNCs (or possibly some other network entity) may include a timer configuration entity 50. The timer configuration entity 50 may be any means such as a device or circuitry embodied in hardware, software or a combination of hardware and software that is configured to configure the timing of the UM RLC entity 40 in embodiments in which the timer of the UM RLC entity 40 is network configurable. As such, for example, the timer configuration entity 50 may be configured to enable the provision of parameters or other information to the UM RLC entity 40 to configure the timer of the UM RLC entity 40. However, in some embodiments, rather than being configurable by the network, the timer of the UM RLC entity 40 may be hardcoded. Operation of the timer configuration entity 50 according to one exemplary embodiment will be described in greater detail below in connection with the description of FIG. 3.

Figure 2:
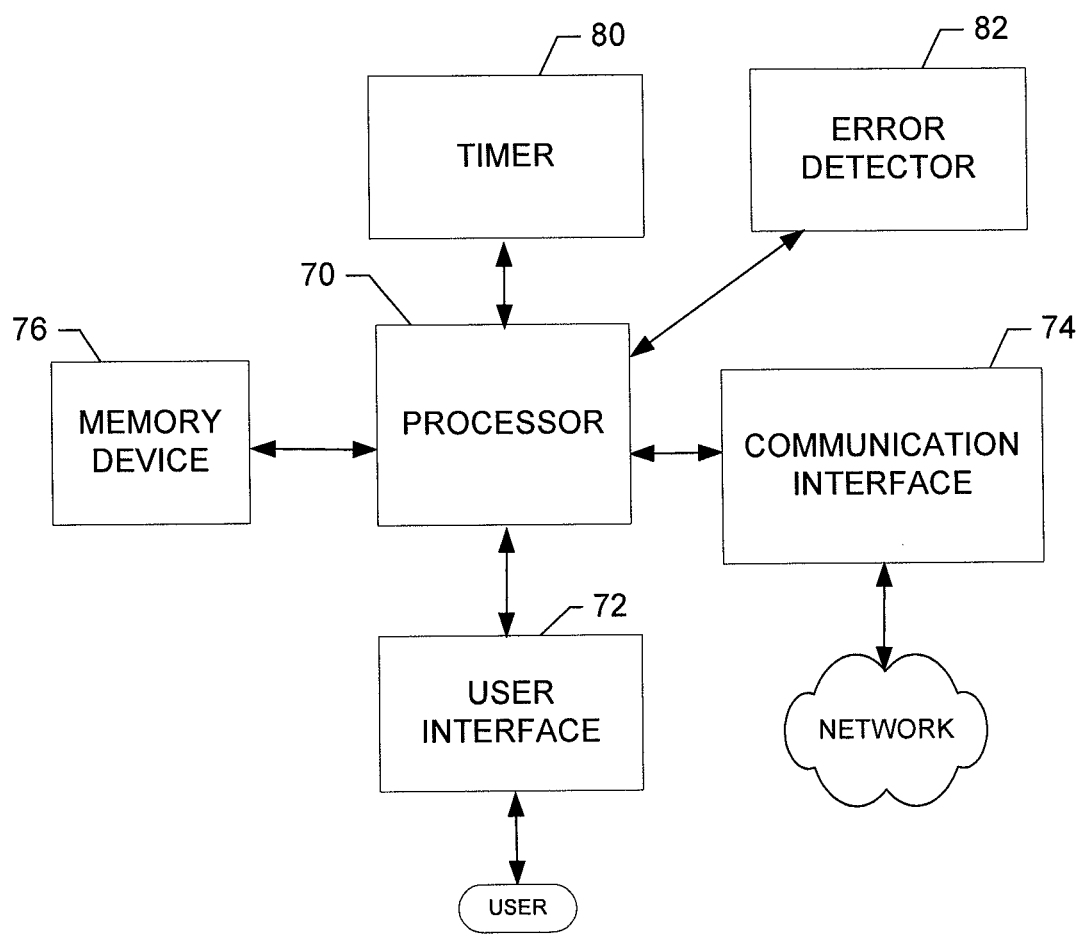
FIG. 2 illustrates a block diagram showing an apparatus for providing ciphering problem detection and recovery according to an exemplary embodiment of the present invention.

FIG. 2 shows a block diagram view of one example of an apparatus (e.g., the UM RLC entity 40) configured to perform exemplary embodiments of the present invention. In this regard, for example, an apparatus for enabling detection of a ciphering problem and facilitating recovery therefrom according to an exemplary embodiment of the present invention may be embodied as or otherwise employed, for example, on the UE 30. However, it should be noted that the apparatus of FIG. 2, may also be employed on a variety of other devices, both mobile and fixed (e.g., a network device such as the RNC 24), and therefore, embodiments of the present invention should not necessarily be limited to application on devices such as mobile terminals or APs. It should also be noted that while FIG. 2 illustrates one example of a configuration of an apparatus for enabling detection of a ciphering problem and facilitating recovery therefrom, numerous other configurations may also be used to implement embodiments of the present invention.

Referring now to FIG. 2, an apparatus for enabling detection of a ciphering problem and facilitating recovery therefrom is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions corresponding to an application for execution by the processor 70. As yet another alternative, the memory device 76 may be one of a plurality of databases that store information in the form of static and/or dynamic information.

The processor 70 may be embodied in a number of different ways. For example, the processor 70 may be embodied as a processing element, a coprocessor, a controller or various other processing means or devices including integrated circuits such as, for example, an ASIC (application specific integrated circuit), FPGA (field programmable gate array) a hardware accelerator or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may otherwise be a general purpose processing element if not for the specific configuration provided by the instructions, to perform the algorithms and operations described herein. However, in some cases, the processor 70 may be a processor of a specific device (e.g., a mobile terminal or UE) adapted for employing embodiments of the present invention by further configuration of the processor 70 by instructions for performing the algorithms and operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as Bluetooth, Infrared, UWB, WiFi, and/or the like.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a trackball, a touch screen, a display, a microphone, a speaker, or other input/output mechanisms. In an embodiment in which the apparatus is embodied at a server or network node (e.g. the node B 14), the user interface 72 may be limited or even eliminated.

In an exemplary embodiment, the processor 70 may be embodied as, include or otherwise control the UM RLC entity 40, which may include a timer 80 and an error detector 82. The timer 80 and the error detector 82 may each be any means such as a device or circuitry embodied in hardware, software or a combination of hardware and software that is configured to perform the corresponding functions of the timer 80 and the error detector 82, respectively.

In an exemplary embodiment, the timer 80 may count either up or down and be considered "expired" or "timed out" either when a count down or count up to a predetermined value has been reached. In some cases, the timer 80 may be set to the predetermined value and count down to zero to achieve expiration. However, in other embodiments, expiration may be achieved at a count down or up to any particular value. In some embodiments, the timer 80 may be reset upon receipt of particular messages from the network (e.g., the node B 14). As such, for example, in response to an initial receipt a first instance of the particular message, the timer 80 may begin counting. Upon subsequent receipt of another instance of the particular message, the timer 80 may be reset and again commence counting. However, if the timer 80 reaches expiration prior to receipt of an instance of the particular message, the timer 80 may indicate the timed out condition to the error detector 82.

In some cases, the timer 80 may not "count" in any direction. Instead, an expiry time could be set for some time in the future after the particular message is received. For example, the expiration of the timer 80 could be set to occur at a time about 2.56 seconds after the particular message is received unless a subsequent message is received in the meantime to reset the timer 80.

In an exemplary embodiment, the particular message may be a UM data PDU received from a transmitter (e.g., node B 14) at the network side. However, in some embodiments, the error detector 82 may be configured to receive the UM data PDUs from the transmitter and inform the timer 80 to signal resetting of the timer 80. In such embodiments, the particular message upon which the timer 80 is signaled to count and reset may be an internal message (with respect to the UM RLC entity 40) received from the error detector 82 rather than an external message received from the transmitter. In some cases, the timer 80 may be configured by the network (e.g., via the timer configuration entity 50) as described in greater detail below. However, in other cases, the timer 80 may be configured internally by the UE 30 or the UM RLC entity 40 based on a hardcoded timer duration.

The error detector 82 may be configured to receive indications from the timer 80 of expiration events in order to detect a ciphering problem or other data transfer problem. In this regard, for example, the failure of the UM RLC entity 40 to receive a UM data PDU within the run time of the timer 80 may be indicative of a data transfer problem. In some examples, the timer 80 may be configured to expire after a 2.56 second delay (or other value indicative of a ciphering problem) to indicate a data transfer problem. The expiration of the timer 80 after a failure to receive a UM data PDU for the timer duration may indicate the data transfer problem in some cases. However, in other cases, the receipt of a UM data PDU after expiration of the timer 80 may indicate the data transfer problem. In either case, the error detector 82 may determine the existence of the data transfer problem based on timer expiration relative to delay involving the receipt of the UM data PDU.

When the existence of the data transfer problem (e.g., a data reception error) is determined, the error detector 82 may be further configured to initiate a cell update procedure. Since the cell update procedure is typically initiated at the UE 30, in instances where the UE 30 detects the data reception error, the error detector 82 may be configured to both detect the data reception error and initiate the cell update procedure. However, in situations where the network detects the data reception error, an instance of the error detector 82 at the network side may signal the UE 30 to inform an instance of the error detector 82 at the UE 30 to initiate the cell update procedure. Of note, the signal to the UE 30 need not be in the form of an explicit message or signal. In this regard, the network may, for example, release a physical channel so that the UE 30 detects a radio link failure, in response to which the UE 30 may initiate a cell update. Thus, the mechanism by which the UE 30 is "signaled" to initiate the cell update procedure need not be an explicit message or even a mechanism specifically associated with directing the UE 30 to initiate the cell update procedure. In some cases, rather than initiating the cell update procedure, the error detector 82 may instead signal to an upper layer for an upper layer device to initiate the cell update procedure.

In an exemplary embodiment, initiation of the cell update procedure by the error detector 82 or by the upper layer may include the stopping of dedicated channel transmission. Moreover, in some instances, recovery from the determined data reception error or data transfer problem may include re-initializing the COUNT-C value with a START value during the cell update procedure with UM RLC re-establishment.

Figure 3:
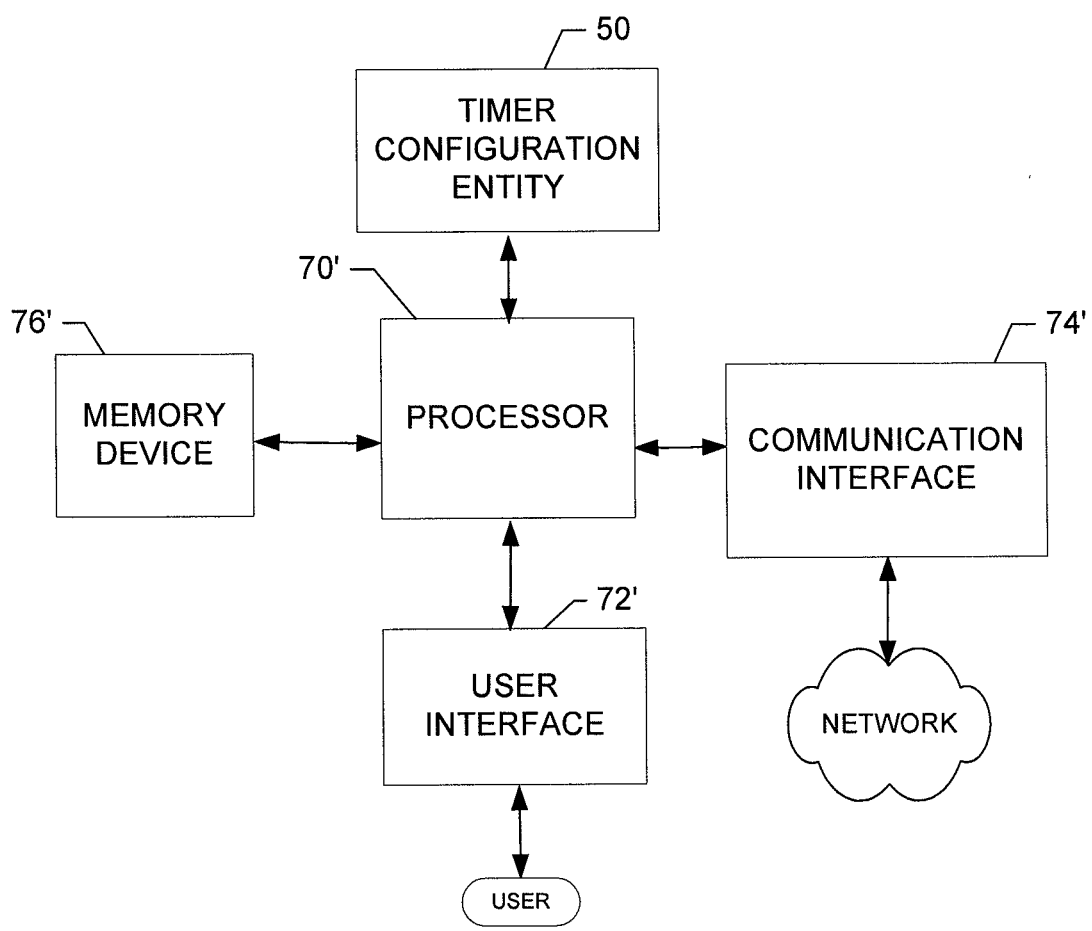
FIG. 3 illustrates a block diagram showing an apparatus for providing network configured timer duration according to an exemplary embodiment of the present invention.

FIG. 3 shows a block diagram of a network side device (e.g., RLC 24) that may include the timer configuration entity 50. As can be seen from FIG. 3, the device may include similar components to those of FIG. 2 in that the device may include memory (e.g., memory device 76'), a processor similar to that of FIG. 2 (e.g., processor 70') except that the processor 70' is configured to include or otherwise control the timer configuration entity 50 (e.g., with additional code hardwired or provided via software to implement timer configuration entity 50 functionality), a communication interface (e.g., communication interface 74'), and a user interface (e.g., user interface 72'). The timer configuration entity 50 may be configured, in embodiments in which it is employed, to provide information for configuring the timer 80. As such, for example, the timer configuration entity 50 may provide the timer 80 with timer duration information. In some cases, the timer configuration entity 50 may provide the timer duration information with a RRC reconfiguration message (e.g., a RadioBearerSetup message, a RadioBearerReconfiguration message, or the like) or with a Cell Update Confirm message or some other purpose specific message not currently specified.

Figure 4:
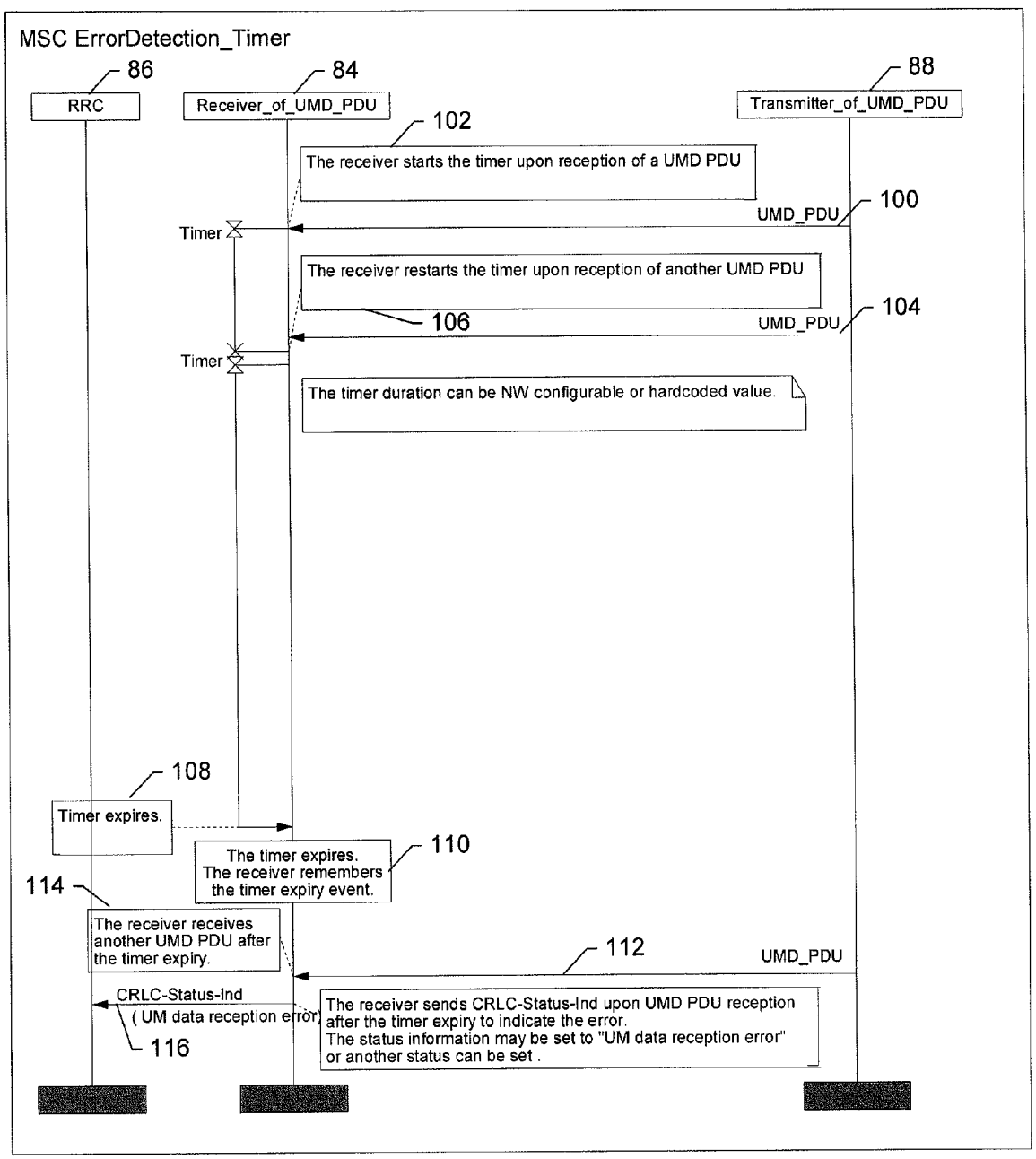
FIG. 4 illustrates a control flow diagram of communications associated with ciphering problem detection according to an exemplary embodiment of the present invention.
Figure 5:
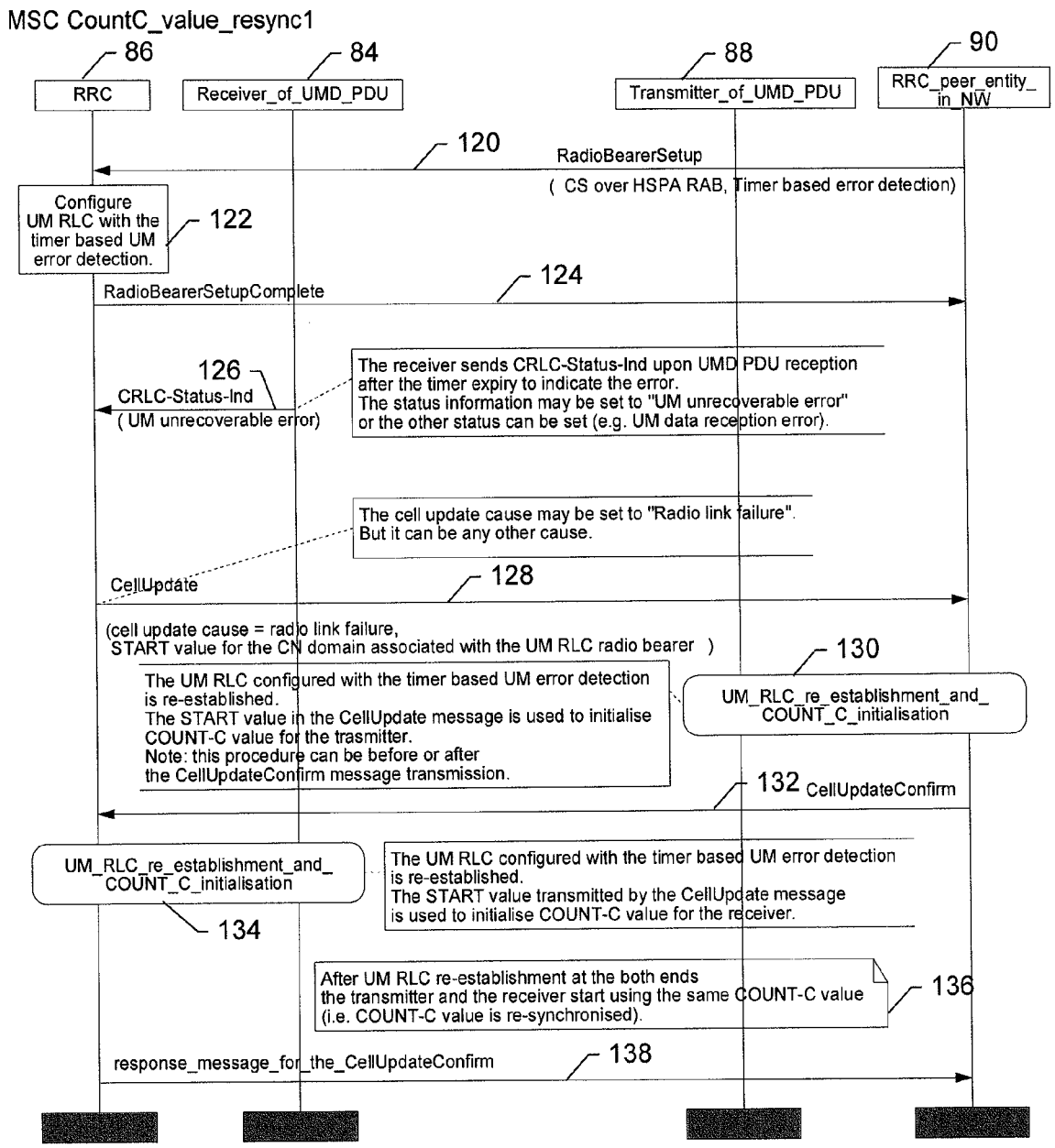
FIG. 5 illustrates a control flow diagram of communications associated with ciphering problem recovery according to an exemplary embodiment of the present invention.
Figure 6:
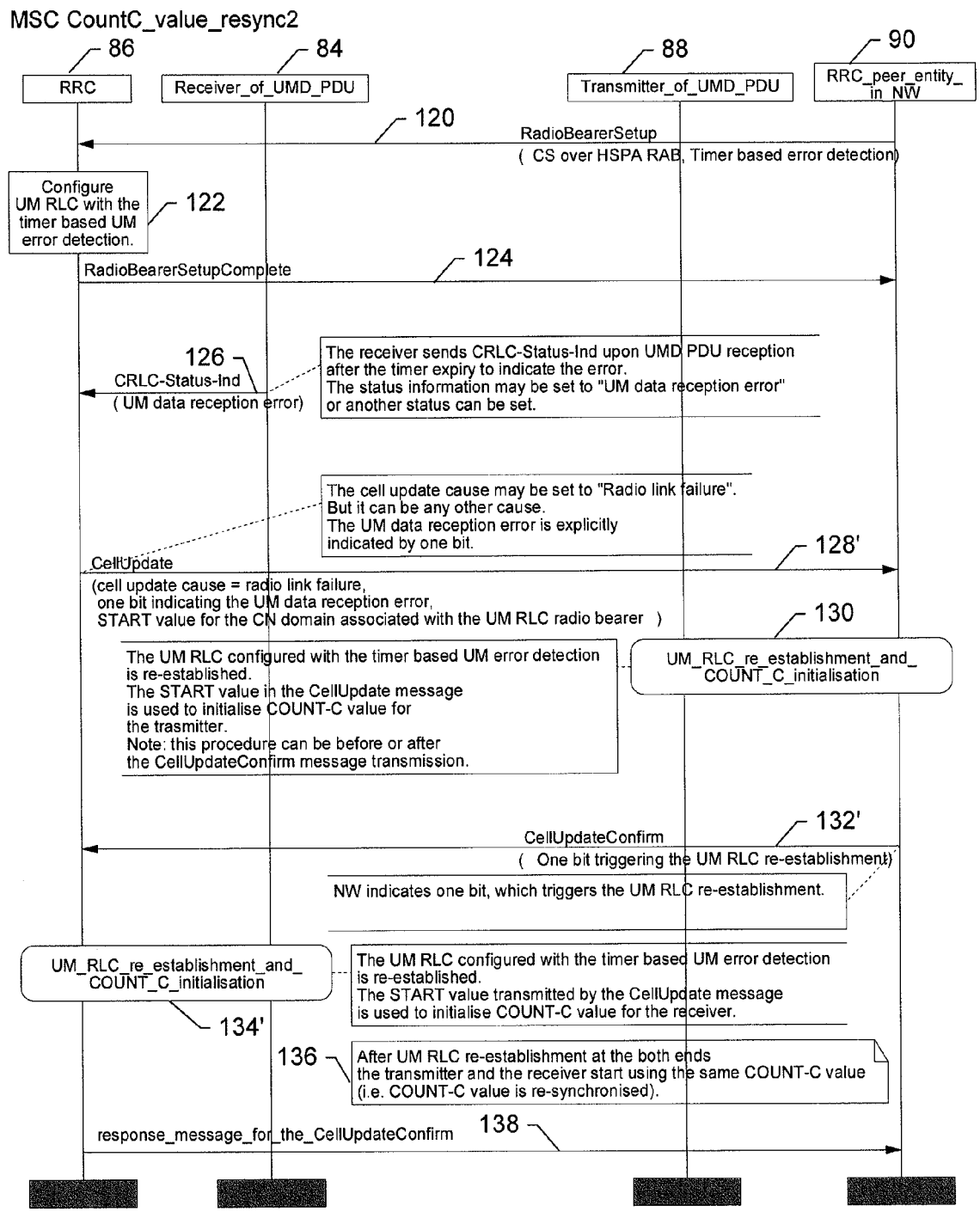
FIG. 6 illustrates a control flow diagram of communications associated with ciphering problem recovery according to another exemplary embodiment of the present invention.

FIGS. 4-6 show control flow diagrams indicating different example communication flows for some exemplary embodiments of the present invention. In this regard, as shown in FIG. 4, a receiving device (e.g., the receiver of the UM data PDU (UMD PDU) 84 (e.g., the UE 30)) may be capable of communication with an instance of an RRC entity (e.g., RRC 86) at the receiver side (e.g., at the UE 30) via any available implementation strategy. The receiving device may be configured to receive the UMD PDU data from a transmitting device (e.g., transmitter of UMD PDU 88).

In an exemplary embodiment, the receiving device may be assumed to have a timer (e.g., an instance of the timer 80). The timer may have a network configurable duration or a hardcoded value as described above. In response to the transmitting device providing a UMD PDU to the receiving device as shown at operation 100, the timer may start when the UMD PDU is received at operation 102. The timer may continue to count and, during the timer run, another UMD PDU may be transmitted by the transmitting device at operation 104. The timer may be restarted upon reception of the other UMD PDU at the receiving device at operation 106. Although only one timer restart is shown in FIG. 4, any number of restarts may occur prior to occurrence of a timer expiration. At operation 108, the timer may expire due to a failure of the receiving device to receive an UMD PDU during the timer run. After expiration of the timer, the receiving device may record or otherwise remember the timer expiry event at operation 110. At a later time, the transmitting device may transmit another UMD PDU at operation 112. However, one or more UMD PDUs could have also been transmitted during the timer run and prior to expiration of the timer, although such UMD PDUs may not have been received by the receiving device. In response to receipt of a UMD PDU subsequent to timer expiration at operation 114, the receiving device may send a CRLC-Status-Ind message internally to the RRC 86 at operation 116 to indicate a UM data reception error. Accordingly, via operation 100 to 116, the detection of a data reception error may be provided.

FIG. 5 shows an example recovery method that may be employed subsequent to detection of a data reception error responsive to operation of an embodiment of the present invention as described above in reference to FIG. 4. FIG. 5 also shows an example of network configuration of the timer. In this regard, as shown at operation 120, a timer configuration message (e.g., RadioBearerSetup message) may initially be provided from an instance of the RRC in the network (e.g., RRC peer entity in NW 90) to configure the timer at operation 122. As an alternative, timer duration may be given by a system information block (SIB) and/or a UTRANMobilityInformation message. As yet another alternative, timer duration may be given in the SIB and/or a UTRANMobilityInformation message and an RRC reconfiguration message (e.g., RadioBearerSetup message, RadioBearerReconfiguration message, or the like) may provide an indication as to whether the timer should be enabled or disabled. If the timer is enabled, then operations 126 and following may be performed. In another alternative embodiment, as described above, the timer may not be network configurable, but may instead have a hardcoded timer duration. In such situations, a specific service (e.g., CS voice over HSPA, VoIP) may be configured by the UM RLC entity 40 with the hardcoded timer duration.

In some embodiments, the timer may be implemented at the UM RLC entity 40. However, in other alternative embodiments, the timer may be implemented in a different layer (e.g., the physical layer). In such a situation, if the different layer does not receive data anticipated to be transmitted for a particular service (e.g., a voice service) at each specific time interval, then the different layer may indicate a data reception error to the upper layer (e.g., the RRC 86). In any case, embodiments of the message may operate based on timing between receipt of subsequent unacknowledged mode messages (e.g., the UMD PDU) in either the uplink or downlink direction. However, although a downlink UMD PDU specifically applies to an embodiment in which the UM RLC entity 40 performs the operations described above, monitoring of data reception of unacknowledged mode messages in the uplink and downlink directions could alternatively be performed by the physical layer, MAC-hs, MAC-ehs, MAC-e, MAC-es, MAC-I, MAC-is or the like in alternative embodiments.

After configuration of the timer, the RRC 86 may reply with a message indicating configuration of the timer is complete at operation 124. At some later time (e.g., responsive to detection of the data reception error by operation according to the example of FIG. 4), the UM data reception error indication may be provided to the RRC 86 at operation 126. During the time prior to the detection of the data reception error, the timer may start and re-start repeatedly with reception of each UMD PDU. As indicated above, when the timer expires, the UM RLC entity 40 may remember the timer expiry so that when a new UMD PDU is received after timer expiry, the UE's downlink UM RLC entity 40 may indicate the data reception error to the RRC 86 as shown at operation 126.

The RRC 86 may initiate or otherwise trigger a cell update procedure (e.g., by sending a cell update message as shown by operation 128). The cell update procedure may include the provision of a START value for the CN domain of the UM RLC entity 40. In some cases, the cell update message may indicate a radio link failure or any other suitable cause. Upon receipt of the cell update message, the transmitting device or network entity may initiate UM RLC re-establishment at operation 130. In an exemplary embodiment, the UM RLC re-establishment may include initializing the COUNT-C value for the UM RLC entity 40 to the START value included in the cell update message for the CN domain of the UM RLC entity 40. As an example, the twenty most significant bits (MSBs) of the HFN component of the COUNT-C value may be set to the START value while remaining bits of the HFN component may be set to zero during the cell update procedure. When and how the network performs the UM RLC re-establishment and the COUNT-C initialization may be determined differently based on different implementation strategies.

The transmitting device may also send a confirmation message (e.g., as shown at operation 132) back to the receiving device to confirm receipt of the cell update message and also to trigger UM RLC re-establishment at the receiving device. UM RLC re-establishment may then proceed at the receiving device as shown at operation 134. In this regard, when the receiving device (e.g., UE 30) receives the cell update confirmation message, the receiving device may re-establish the UM RLC entity and set the 20 MSBs of the HFN component of the COUNT-C value to the "START" value included in the cell update message for the CN domain of the UM RLC entity 40 and sets remaining bits of the HFN component of the COUNT-C value of the UM RLC entity 40 to zero. After the UM RLC re-establishment at both ends, the COUNT-C values for the receiving device and the transmitting device are re-synchronized as indicated at block 136 and recovery has been accomplished from the ciphering problem. At operation 138, the RRC 86 may further provide the peer RRC in the network with a response message for the cell update confirmation message received at operation 132.

In some alternative embodiments, modifications may be made to the operations described above. As an example, FIG. 6 shows one alternative embodiment in which changes are made to the cell update portion of the embodiment of FIG. 5. In this regard, for example, cell update message 128' may further include one bit indicating the UM data reception error. At operation 132', the cell update message provided from the transmitting device back to the receiving device may also include one bit set by the network in order to trigger RLC re-establishment at the UM RLC entity 40. In such an embodiment, the receiving device re-establishes the UM RLC entity 40 in response to the corresponding bit being set in the received cell update message at operation 134'.

As indicated above, in some embodiments, the network side (e.g., the transmitting device) may also include a timer to monitor uplink UM RLC activity. Thus, the network side may also be enabled to detect data transfer problems in the uplink. In such situations, the operation of the system may be similar to that discussed above for the downlink direction except that the timer starts or resets upon reception of uplink UMD PDUs. Additionally, in such situations, the timer may be configured internally within the network node receiving the uplink UMD PDU and the network node may be required to signal for initiation of the cell update procedure rather than initiating the cell update procedure itself. Timer expiration is recorded and re-establishment may then be performed as described above. Any combination of the above described alternatives may also be utilized.

Figure 7:
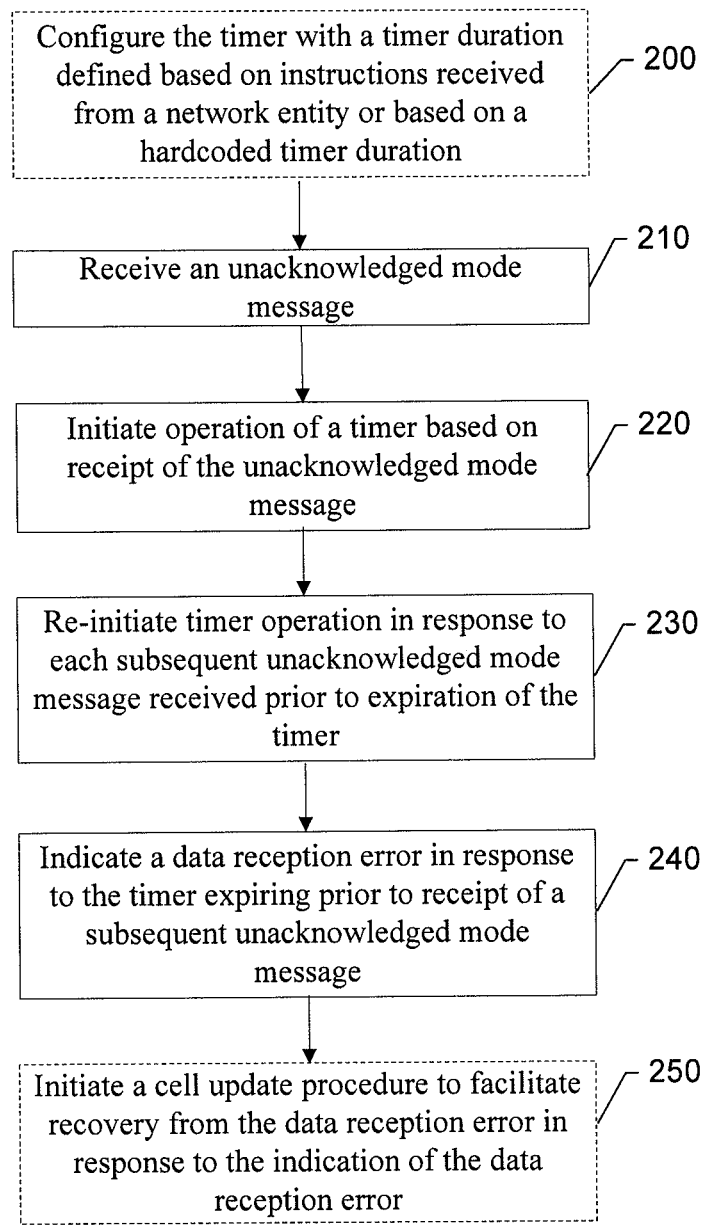
FIG. 7 is a flowchart according to an exemplary method of providing detection from a ciphering problem for an unacknowledged mode radio bearer is provided according to an exemplary embodiment of the present invention.

FIG. 7 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a non-transitory memory device of a terminal (e.g., UE 30) or network node (e.g., node B 14) and executed by a processor in the terminal or network node. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing detection and recovery from a data transfer problem as provided in FIG. 7 may include receiving an unacknowledged mode message at operation 210 and initiating operation of a timer based on receipt of the unacknowledged mode message at operation 220. In some cases, the unacknowledged mode message may be an unacknowledged mode data protocol data unit (UM data PDU). The method may further include re-initiating timer operation in response to each subsequent unacknowledged mode message received prior to expiration of the timer at operation 230 and indicating a data reception error in response to the timer expiring prior to receipt of a subsequent unacknowledged mode message at operation 240. In some cases, the timer expiration may be recorded as a timer expiry event. In some embodiments, the indication of the data reception error may be provided either immediately at the time of expiration of the timer (e.g., directly in response to timer expiration) or when a subsequent unacknowledged mode message is received after timer expiration (e.g., indirectly in response to timer expiration). The method of FIG. 7 could be performed by either a network entity or by an entity at the user's side (e.g., UE 30).

In some exemplary embodiments, further optional operations may be included, some examples of which are shown in dashed lines in FIG. 7. In this regard, the method may further include configuring the timer with a timer duration defined based on instructions received from a network entity or defined based on a hardcoded timer duration at operation 200. In some embodiments, the method may further include initiating a cell update procedure to facilitate recovery from the data reception error in response to the indication of the data reception error at operation 250. In an exemplary embodiment, initiating the cell update procedure to facilitate recovery from the data reception error may include providing a particular value in a cell update message to a network entity in which the particular value enables re-synchronization of a transmitter of the unacknowledged mode message with the receiver of the unacknowledged mode message. In some cases, the particular value may be a START value provided in the cell update message to initialize a COUNT-C value to a value used by the network entity.

In an exemplary embodiment, an apparatus for performing the method above may include a processor (e.g., the processor 70) configured to perform each of the operations (200-250) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 200 to 250 may include, for example, an algorithm for managing operation of the timer 80 and the error detector 82, the error detector 82, or the processor 70.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least perform the following:
   cause a message to be provided indicative of a data reception error has occurred with respect to reception of unacknowledged mode messages, wherein causing the message to be provided comprises causing a particular value to be provided to enable resynchronization of a transmitter of the unacknowledged mode messages with a receiver of the unacknowledged mode messages;
   receive a confirmation message including an initialization value based on the particular value; and
   reestablish the receiver of the unacknowledged mode messages in accordance with the initialization value.

2. The apparatus of claim 1, wherein the particular value comprises a START value provided in a cell update message, and wherein the initialization value comprises a COUNT-C value based on the START value.

3. The apparatus of claim 2, wherein the COUNT-C value comprises the START value.

4. The apparatus of claim 1, wherein the instructions further cause the apparatus to cause a message to be provided by causing a cell update message to be provided that includes at least one bit indicative of the data reception error, and wherein the instructions further cause the apparatus to receive the confirmation message by receiving the confirmation message that includes at least one bit to trigger reestablishment of the receiver.

5. The apparatus of claim 1, wherein the instructions further cause the apparatus to receive unacknowledged mode messages following reestablishment of the receiver in accordance with the initialization value.

6. The apparatus of claim 5, wherein the instructions further cause the apparatus to monitor the unacknowledged mode messages to identify the data reception error.

7. The apparatus of claim 6, wherein the instructions further cause the apparatus to monitor the unacknowledged mode messages by:
   receive the unacknowledged mode message;
   initiate operation of a timer based on receipt of the unacknowledged mode message;
   re-initiate timer operation in response to each subsequent unacknowledged mode message received prior to expiration of the timer; and
   indicate the data reception error in response to the timer expiring prior to receipt of a subsequent unacknowledged mode message.

8. A method comprising:
   causing a message to be provided indicative of a data reception error has occurred with respect to reception of unacknowledged mode messages, wherein causing the message to be provided comprises causing a particular value to be provided to enable resynchronization of a transmitter of the unacknowledged mode messages with a receiver of the unacknowledged mode messages;
   receiving a confirmation message including an initialization value based on the particular value; and
   reestablishing the receiver of the unacknowledged mode messages in accordance with the initialization value.

9. The method of claim 8, wherein the particular value comprises a START value provided in a cell update message, and wherein the initialization value comprises a COUNT-C value based on the START value.

10. The method of claim 9, wherein the COUNT-C value comprises the START value.

11. The method of claim 8, wherein causing a message to be provided comprises causing a cell update message to be provided that includes at least one bit indicative of the data reception error, and wherein receiving the confirmation message comprises receiving the confirmation message that includes at least one bit to trigger reestablishment of the receiver.

12. The method of claim 8, further comprising receiving unacknowledged mode messages following reestablishment of the receiver in accordance with the initialization value.

13. The method of claim 12 further comprising monitoring the unacknowledged mode messages to identify the data reception error.

14. The method of claim 13, wherein monitoring the unacknowledged mode messages comprises:
   receiving the unacknowledged mode message;
   initiating operation of a timer based on receipt of the unacknowledged mode message;

re-initiating timer operation in response to each subsequent unacknowledged mode message received prior to expiration of the timer; and indicating the data reception error in response to the timer expiring prior to receipt of a subsequent unacknowledged mode message.

15. A computer program product comprising at least one non-transitory computer-readable storage medium having computer-executable program code instructions stored therein, the computer-executable program code instructions comprising:

program code instructions for causing a message to be provided indicative of a data reception error has occurred with respect to reception of unacknowledged mode messages, wherein the program code instructions for causing the message to be provided comprise program code instructions for causing a particular value to be provided to enable resynchronization of a transmitter of the unacknowledged mode messages with a receiver of the unacknowledged mode messages;

program code instructions for receiving a confirmation message including an initialization value based on the particular value; and program code instructions for reestablishing the receiver of the unacknowledged mode messages in accordance with the initialization value.

16. The computer program product of claim 15, wherein the particular value comprises a START value provided in a cell update message, and wherein the initialization value comprises a COUNT-C value based on the START value.

17. The computer program product of claim 16, wherein the COUNT-C value comprises the START value.

18. The computer program product of claim 15, wherein the program code instructions for causing a message to be provided comprise program code instructions for causing a cell update message to be provided that includes at least one bit indicative of the data reception error, and wherein the program code instructions for receiving the confirmation message comprise program code instructions for receiving the confirmation message that includes at least one bit to trigger reestablishment of the receiver.

19. The computer program product of claim 15, further comprising program code instructions for initiating a cell update procedure to facilitate recovery from the data reception error in response to the indication of the data reception error.

20. The computer program product of claim 19, wherein program code instructions for initiating the cell update procedure to facilitate recovery from the data reception error include instructions for providing a particular value in a cell update message to a network entity, the particular value enabling re-synchronization of a transmitter of the unacknowledged mode message with the receiver of the unacknowledged mode message.

21. The computer program product of claim 15 wherein the computer-executable program code instructions comprise program code instructions for causing the apparatus to receive unacknowledged mode messages following reestablishment of the receiver in accordance with the initialization value.

* * * * *

UNITED STATES PATENT AND TRADEMARK OFFICE
CERTIFICATE OF CORRECTION

PATENT NO. : 8,494,451 B2
APPLICATION NO. : 12/363001
DATED : July 23, 2013
INVENTOR(S) : Charles et al.

Page 1 of 1

It is certified that error appears in the above-identified patent and that said Letters Patent is hereby corrected as shown below:

On the Title page,

Item (75) Inventors: Delete "Weybridge (JP)" should read --Weybridge (GB)--.

Signed and Sealed this
Twelfth Day of November, 2013

Teresa Stanek Rea
*Deputy Director of the United States Patent and Trademark Office*